United States Patent

Tanimoto et al.

[11] Patent Number: 6,010,167
[45] Date of Patent: Jan. 4, 2000

[54] OUTSIDE DOOR HANDLE ASSEMBLY FOR A VEHICLE

[75] Inventors: Tetsurou Tanimoto, Anjyo; Kouichi Nagata, Obu; Morihito Nomura, Toyoake; Kouji Ooe, Nagoya, all of Japan

[73] Assignee: Aisin Seiki Kabushiki Kaisha, Japan

[21] Appl. No.: 08/988,992

[22] Filed: Dec. 11, 1997

[30] Foreign Application Priority Data

Dec. 12, 1996 [JP] Japan ..................................... 8-332528

[51] Int. Cl.$^7$ ....................................................... E05B 3/00
[52] U.S. Cl. ............... 292/336.3; 292/347; 292/DIG. 41
[58] Field of Search ................................ 292/336.3, 216, 292/DIG. 65, DIG. 3, DIG. 22, DIG. 23, DIG. 41, DIG. 56, 347; 180/281, 282; 16/438

[56] References Cited

U.S. PATENT DOCUMENTS

| | | | |
|---|---|---|---|
| 3,719,248 | 3/1973 | Breitschwerdt | 180/112 |
| 3,848,909 | 11/1974 | Foley | 292/216 |
| 3,858,921 | 1/1975 | Kuki | 292/336.3 |
| 5,348,357 | 9/1994 | Kouchan | 292/216 |
| 5,431,462 | 7/1995 | Lignell | 292/336.3 |
| 5,499,851 | 3/1996 | Mitchell | 292/347 |
| 5,584,516 | 12/1996 | Cetnar | 292/336.3 |
| 5,669,642 | 9/1997 | Kang | 292/336.3 |
| 5,743,575 | 4/1998 | McFarland | 292/336.3 |

FOREIGN PATENT DOCUMENTS 27 356   9/1955   Denmark ............................... 292/216

OTHER PUBLICATIONS

"Nissan Infinity Q45" issued by Nissan Motor Company, Oct.1989 (3 pages).

*Primary Examiner*—Flemming Saether
*Assistant Examiner*—Gary Estremsky
*Attorney, Agent, or Firm*—Finnegan, Henderson, Farabow, Garrett & Dunner, L.L.P.

[57] ABSTRACT

An outside door handle assembly for a vehicle comprises a case mounted to a vehicle door, a handle rotatably supported by the case and having a grip portion and a pair of supporting arms extending from the grip portion, a balance weight, disposed between the pair of supporting arms in such a manner as to oppose the grip portion with respect to a rotational center of the handle, fixed to the pair of supporting arms at both ends thereof and having substantially the same weight as that of the grip portion, a shaft portion formed on one end of the balance weight and extending through one of the pair of supporting arm and an operation portion mounted to the shaft portion and connected to a door lock mechanism.

4 Claims, 3 Drawing Sheets

OUTSIDE DOOR HANDLE ASSEMBLY FOR A VEHICLE

BACKGROUND OF THE INVENTION

The present invention relates to a outside door handle assembly for a vehicle.

As a conventional outside door handle assembly, there has been known an apparatus or assembly disclosed in a new model car manual "NISSAN INFINITY Q45" issued by NISSAN MOTOR COMPANY on October 1989.

The conventional assembly is structured such as to include a case mounted to a vehicle door, a handle rotatably supported on the case and having a grip portion and a pair of supporting arms extending from the grip portion, a balance weight disposed between the pair of supporting arms in such a manner as to oppose to the grip portion with respect to a rotational center of the handle and fixed to the pair of supporting arms at both ends thereof, the balance weight having substantially the same weight as that of the grip portion, and an operation portion mounted to one of the pair of supporting arms so as to operate a door lock mechanism or apparatus for opening or closing the vehicle door.

Further, in the conventional apparatus, it is structured such that the operation portion mounted on the supporting arm is moved by gripping the grip portion and then rotating the handle with respect to the case, so that the door lock apparatus is operated to open the door. Further, in the case that an inertia force of the direction rotating the handle is applied at a time of vehicle collision, the grip portion and the balance weight are well balanced, so that the inertia force prevents the handle from rotating and the door from accidentally opening.

However, in the conventional apparatus mentioned above, since the balance weight and the operation portion is mounted to different portions of the supporting portion, the supporting arm becomes large and the number of the parts is increased, so that there is a fear that the assembling operation becomes complex and the cost therefor becomes disadvantageously high.

SUMMARY OF THE INVENTION

Accordingly, an object of the invention is to improve a mounting structure of a balance weight and an operation portion with respect to a supporting portion so as to reduce the number of parts of a outside door handle assembly.

To achieve the objects and in accordance with the purpose of the invention as embodied and broadly described herein, the outside door handle assembly of this invention comprises a case mounted to a vehicle door, the case having spaced arms and a pin extending between the spaced arms, a handle rotatably supported on the pin of the case and having a grip portion and a pair of supporting arms extending inwardly from the grip portion, a balance weight disposed between the pair of supporting arms in such a manner as to be opposed to the grip portion with respect to a rotational center of the handle and secured to the pair of supporting arms at each of the two ends of the balance weight, a shaft portion formed on one of the ends of the balance weight and extending through one of the pair of supporting arms, and a release member coaxially arranged with respect to the shaft portion of the balance weight to be engageable with a member of a door lock apparatus mounted in the vehicle door.

In accordance with this technical means, the balance weight has the shaft portion and the operation portion is mounted to the balance weight by means of the shaft portion of the balance weight, and the operation portion and the balance weight are coaxially disposed. Accordingly, in mounting the operation portion and the balance weight, the number of the parts can be reduced.

DETAILED DESCRIPTION OF THE PREFERRED EMBODIMENTS

Figure 1:
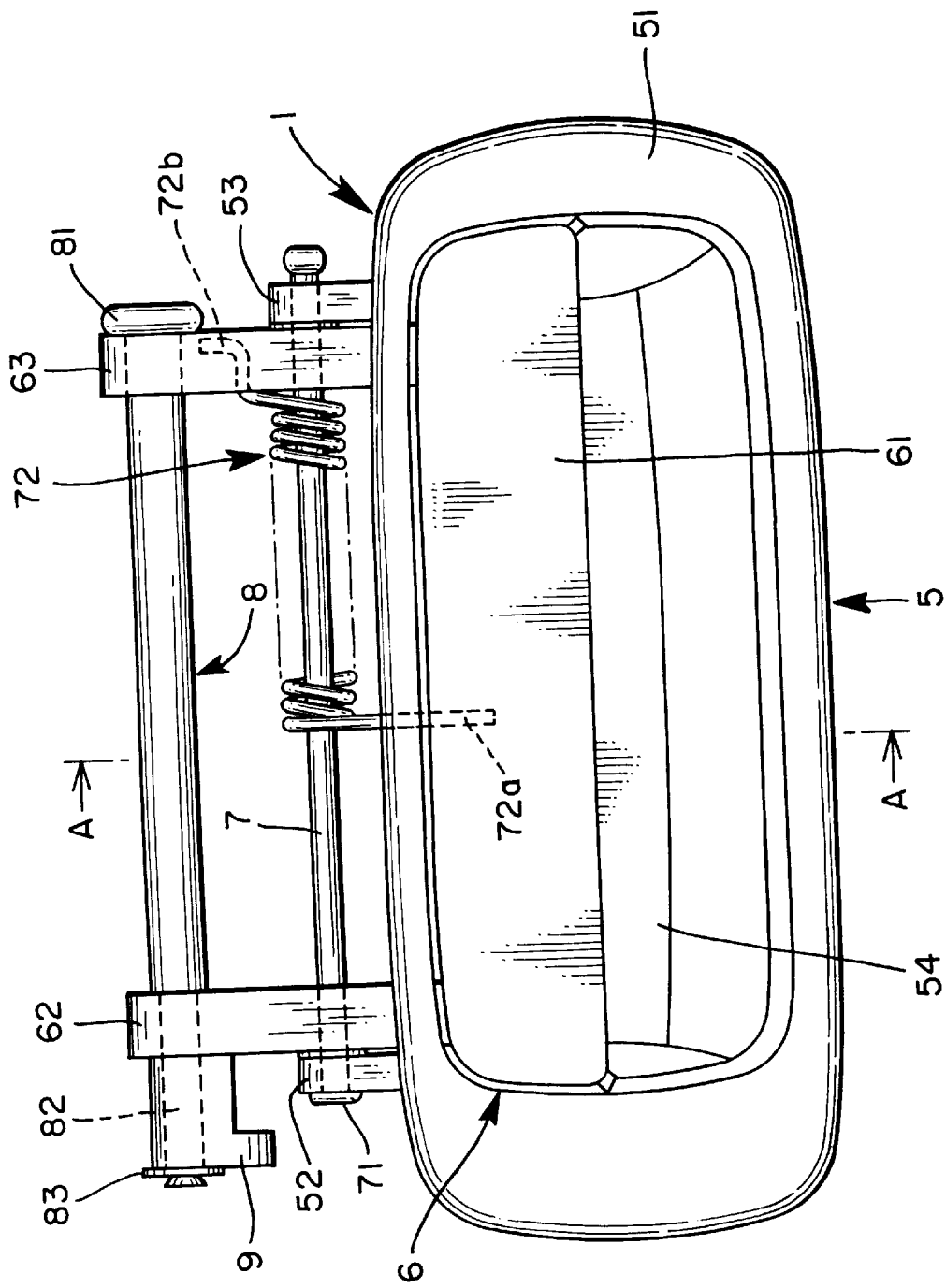
FIG. 1 is a front elevational view which shows an outside door handle assembly for a vehicle in accordance with the present invention.
Figure 2:
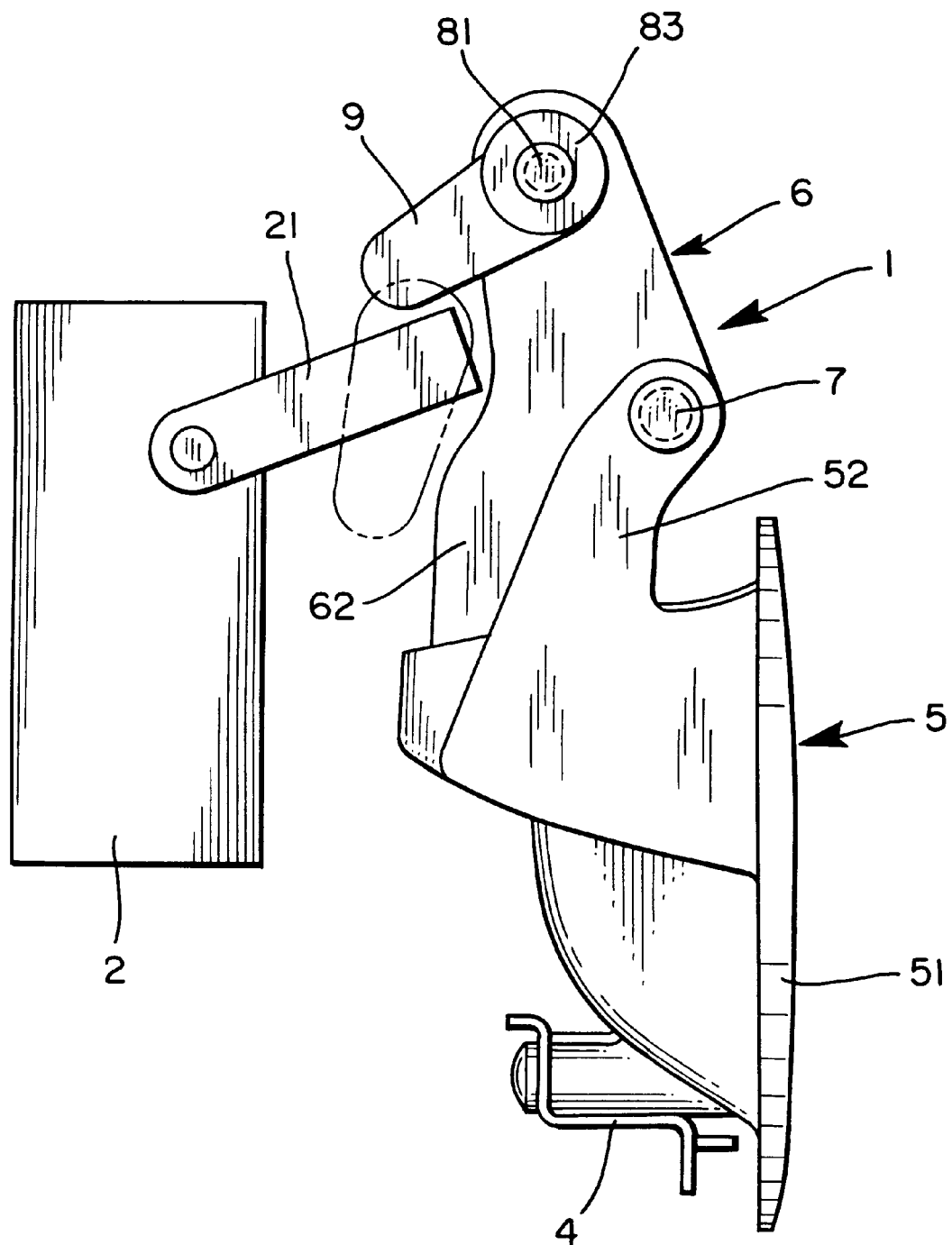
FIG. 2 is a side elevational view of FIG. 1.
Figure 3:
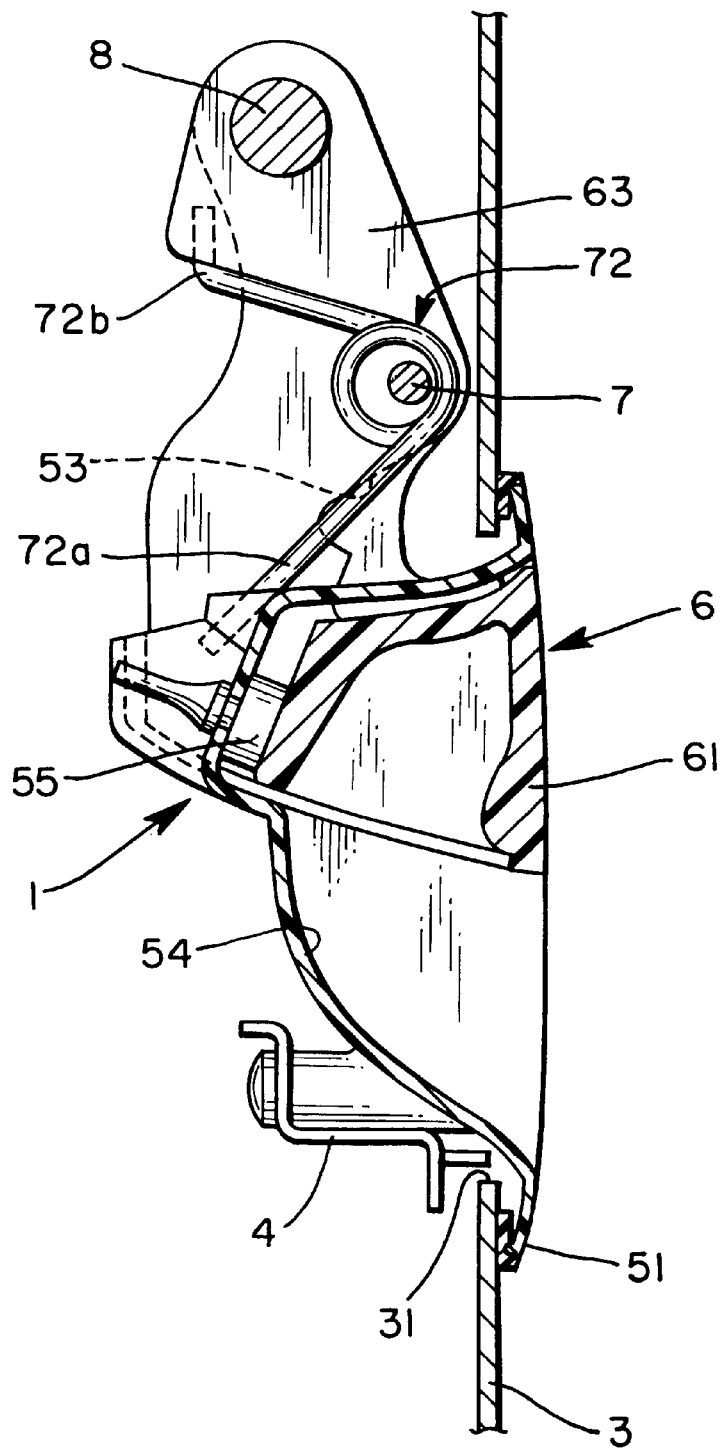
FIG. 3 is a cross sectional view taken along a line A—A in FIG. 1.

As shown in FIGS. 1 to 3, an outside door handle assembly 1 mainly comprises a box-like case 5 mounted to a vehicle door and a handle 6 rotatably supported on the case 5 and connected to an open lever 21 of a door lock mechanism or apparatus 2 for opening or closing the vehicle door.

The case 5 is shaped in a box-like shape having a flange portion 51 in a peripheral edge thereof, and is disposed in such a manner as to close an opening 31 provided in a door outside panel 3 of the vehicle door by projecting toward an inner space of the vehicle door from the door outside panel 3 through the opening 31 and is screwed to a plate 4 within the vehicle door. A pair of arm portions 52 and 53 opposing in parallel to each other and with a predetermined interval or distance are formed on the case 5 so as to be positioned within an inner space of the vehicle door.

The handle 6 is provided with a grip portion 61 disposed within a recess portion 54 open to an exterior side, and a pair of arm portions 62 and 63 extending inwardly from the grip portion 61 are formed in the grip portion 61 so as to be positioned within the interior space of the vehicle door. The arm portions 62 and 63 are in parallel to each other and are opposed to each other with a predetermined interval or distance narrower than that of the arms 52 and 53 of the case 5 and extend through an oblong hole (not shown) formed on the case 5 so as to be opposed to the arm portions 52 and 53.

A continuous pin 7 having a head portion 71 at an end of the arm portions 62 and 52 extends through the arm portions 62 and 63 of the handle 6 and the arm portions 52 and 53 of the case 5. Accordingly, the handle 6 is rotatably supported to the case 5, and the handle 6 is rotated around the pin 7 with respect to the case 5. In this case, the pin 7 is caulked at another end of the arm portions 63 and 53 so as to prevent the pin 5 from falling out of the arm portions 62, 63, 52 and 53. Further, a coil spring 72 having an end 72a engaged with the case 5 and the other end 72b engaged with the handle 6 is disposed around the pin 7, and the handle 6 is always urged to be rotated clockwise in FIG. 3 in such a manner that the grip portion 61 is positioned within the recess portion 54 of the case 5 by receiving the urging force of the coil spring 72. Accordingly, the handle 6 is always held in a state of making the door lock mechanism or apparatus 2 non-operation. In this case, the position of the handle 6 with respect to the case 5 in this state is restricted by a contact between a rubber stopper 55 provided in the case 5 and the grip portion 61 of the handle 6.

The arm portions 62 and 63 of the handle 6 extend inwardly at a larger degree than that of the arm portions 52 and 53 of the case 5. A rod-shaped balance weight 8 having a head portion 81 at the side of the arm portion 63 extends horizontally through the front end of the arm portions 62 and 63. The balance weight 8 has substantially the same weight as that of the grip portion 61 of the handle 6 and is disposed in such a manner as to be opposed to the grip portion 61 with respect to the pin 7. The balance weight 8 is positioned between the arm portions 62 and 63 and is fixed to the arm portions 62 and 63 by extending there through in the above manner. Further, the one end of the balance weight 8 extends over the arm portion 62 so as to oppose to the open lever 21 of the door lock mechanism or apparatus 2, and has a shaft portion 82. A release member 9 capable of being brought into contact with the open lever 21 is supported to the shaft portion 82 of the balance weight 8. The release member 9 is made of a material which soften a contact sound due to the contact with the open lever 21, and is not brought into contact with the open lever 21 in a state that the grip portion 61 of the handle 6 is in contact with the stopper 55 so as to be positioned within the recess portion 54 of the case 5, thereby making the door lock mechanism or apparatus 2 in a non-operating state. In this case, the balance weight 8 and the release member 9 are prevented from falling out of the arm portions 62 and 63 by caulking the end of the shaft portion 82, that is, the arm portion 62 end of the balance weight 8 through a washer 83. As mentioned above, since the balance weight 8 is secured to the arm portions 62 and 63 so as to be supported at both portions thereof, an axial length thereof can be extended. Accordingly, even when the weight of the grip portion 61 becomes larger, the balance weight 8 can be sufficiently balanced with the grip portion 61 by extending the axial length of the balance weight 8 without enlarging the diameter of the balance weight 8. Therefore, the outside door handle assembly 1 can be constructed in a more compact manner in a thickness direction.

The release member 9 may be integrally formed with the shaft portion 82 (the end of the arm portion 62 side) of the balance weight 8. In this case, the integral portion also serves as the head portion of the balance weight 8, so that the balance weight 8 is prevented from falling out by being caulked at the end (the end of the arm portion 63 side) opposing to the integral portion. Further, it is preferable to apply a resin coating for softening the contact sound with the open lever 21 to the integral portion.

Next, an operation of the outside door assembly will be described below.

When the handle 6 is rotated around the pin 7 in a counterclockwise direction shown in FIG. 3 with respect to the case 5 against the urging force of the coil spring 72 by holding the grip portion 61, the release member 9 moves from a position shown by a solid line in FIG. 2 to a position shown by dotted line in FIG. 2 along a track around the pin 7 so as to be brought into contact with the open lever 21 of the door lock mechanism or apparatus 2, thereby rotating the open lever 21 in a clockwise direction shown in FIG. 2.

Accordingly, the door lock mechanism or apparatus 2 is operated in such a manner as to open the vehicle door so that the vehicle door in a closed state becomes an open state.

Further, in the case of an inertia force in a direction of rotating the handle 6 against the urging force of the coil spring 72 as in the same manner as that mentioned above at a time of vehicle collision, the grip portion 61 receiving the inertia force is balanced with the balance weight 8 so as to cancel the inertia force applied to the grip portion 61. Accordingly, the handle 6 is prevented from rotating due to the inertia force, and the vehicle door in a closed state is prevented from suddenly becoming an open state.

In accordance with the invention, since the shaft portion is formed in the balance weight and the release member to be engaged with the open lever of the door lock apparatus is mounted to the shaft portion, the release member and the balance weight can be coaxially disposed. Accordingly, in constructing the release member and the balance weight, the number of the parts can be reduced and the work necessary for assembling and the cost can be greatly reduced in comparison with the conventional apparatus.

As many apparently widely different embodiments of the present invention can be made without departing from the spirit and scope thereof, it is to be understood that the invention is not limited to the specific embodiments thereof except as defined in the appended claims.

What is claimed is:

1. An outside door handle assembly for a vehicle comprising a case mounted to a vehicle door, the case having spaced arms and a pin extending between the spaced arms, a handle rotatably supported on the pin of the case and having a grip portion and a pair of supporting arms extending inwardly from the grip portion, a balance weight disposed between the pair of supporting arms in such a manner as to be opposed to the grip portion with respect to a rotational center of the handle and secured to the pair of supporting arms at each of the two ends of the balance weight, a shaft portion formed on one of the ends of the balance weight and extending through one of the pair of supporting arms, and a release member coaxially arranged on the shaft portion of the balance weight to be engageable with a member of a door lock apparatus mounted in the vehicle door.

2. An outside door handle assembly according to claim 1, wherein the release member is integrally formed with the shaft portion of the balance weight.

3. An outside door handle assembly according to claim 1, wherein a resin coating is applied to an outer surface of the release member so as to soften a contact sound with the member of the door lock apparatus.

4. An outside door handle assembly according to claim 1, wherein the balance weight has substantially the same weight as that of the grip portion.

* * * * *